UNITED STATES PATENT OFFICE.

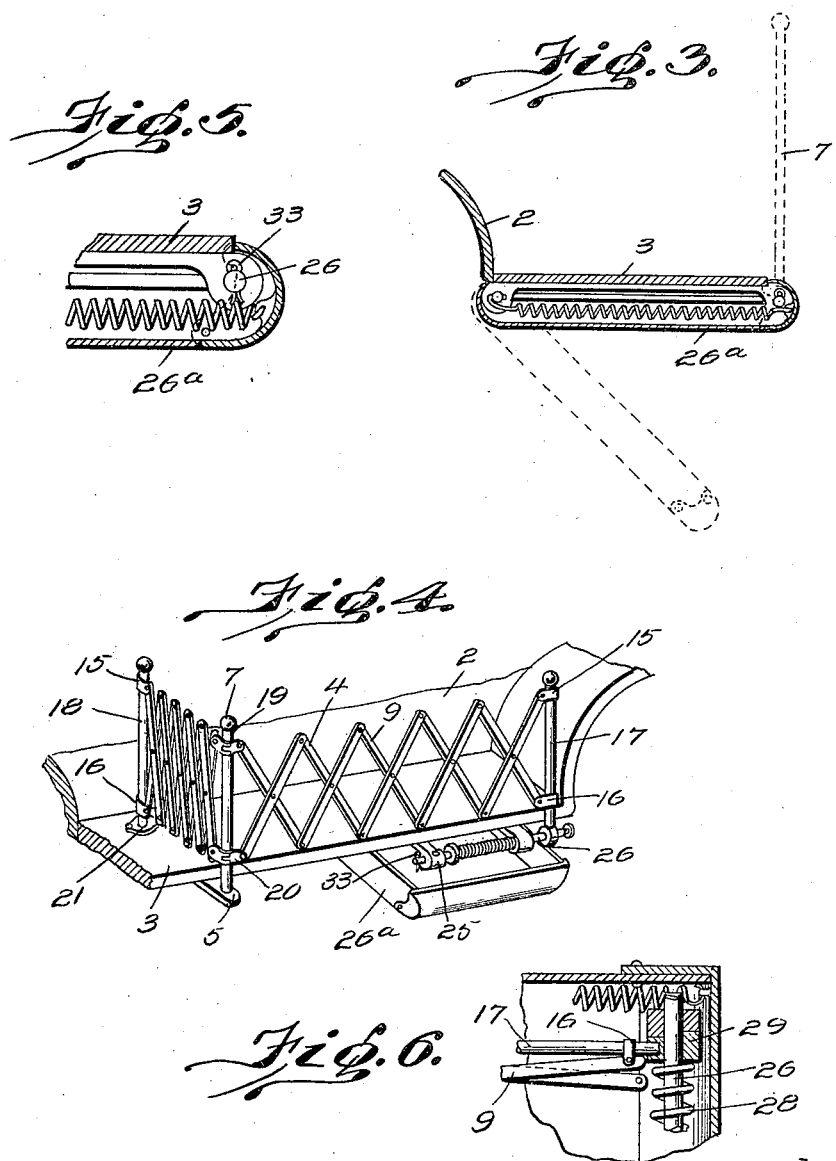

JOHN M. LOVELESS, OF GLEZEN, INDIANA.

AUTO-CARRIER.

1,392,777.  Specification of Letters Patent.  Patented Oct. 4, 1921.

Application filed September 23, 1920. Serial No. 412,127.

*To all whom it may concern:*

Be it known that I, JOHN M. LOVELESS, a citizen of the United States, residing at Glezen, in the county of Pike and State of Indiana, have invented certain new and useful Improvements in an Auto-Carrier, of which the following is a specification.

This invention relates to a luggage carrier for use with automobiles, and more particularly to the class of disappearing carriers for attachment to the running board of vehicles.

The primary object of the invention is the provision of a luggage carrier of this type wherein the same when not being used is folded beneath the running board of an automobile and concealed from view and means to adjust the carrier in various positions relative to the running board.

Another object of the invention resides in the construction of a luggage carrier of the collapsible or lazy tong type which may be adjusted in various positions along the running board of an automobile and when not in use concealed from view beneath the said running board.

A still further object of my invention resides in the construction of a collapsible luggage carrier and a housing beneath the running board of an automobile to receive the carrier in its knocked down or collapsed condition which will not detract from the appearance of the automobile when said carrier is not being used.

A still further and important object of my invention resides in the construction of a collapsible, adjustable luggage carrier which may be concealed when not in use beneath the running board of an automobile with means for adjusting the carrier various lengths along the running board to accommodate articles of luggage of various dimensions.

Another important object of my invention is the provision of a carrier of the above type which is comparatively simple in construction, quickly and easily adjusted, strong and durable to withstand rough usage, reliable, highly efficient and capable of use on any type of automobile, of but few parts and therefore inexpensive and cheap to manufacture.

With these objects in view and others which will be suggested as the purpose and nature of my invention are revealed in the preferred embodiment herein shown, wherein—

Fig. 3 shows the carrier when concealed beneath its running board.

Fig. 4 shows a second and modified position of the carrier on the running board.

Figs. 5 and 6 are detail views.

Figure 1:
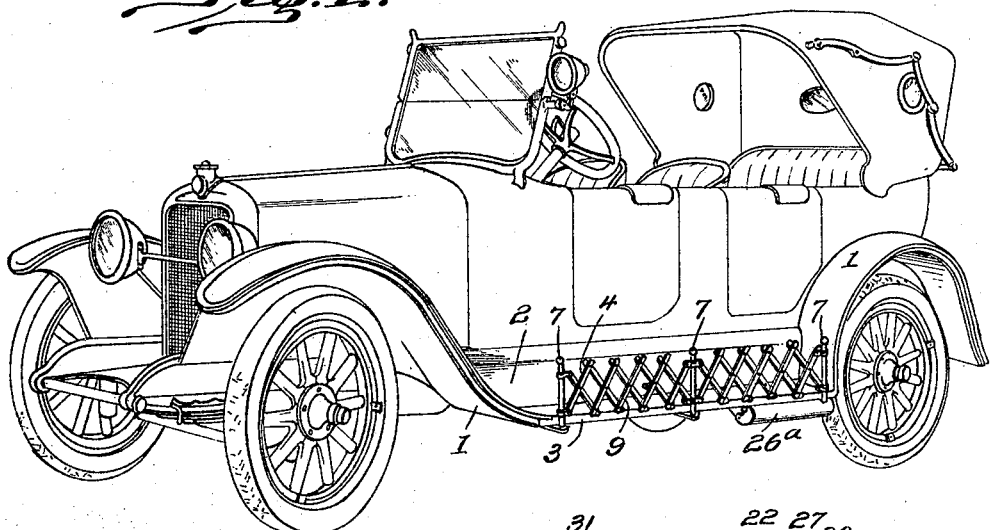
Figure 1 is a perspective view showing the luggage carrier installed on the running board of an automobile.

Similar numerals in the specification referring to corresponding parts on the drawing, numeral 1 designates the front and rear fenders, 2 the splash pan and 3 the running board on each side of the body of an automobile which carries the luggage carrier 4 now to be described.

Beneath the running board 3 a plurality of hinged brackets 5 are provided with apertured ends 6 which may be swung slightly beyond the front edge of the board to receive vertical uprights 7, screw threaded at their lower ends for reception in said brackets. Any desirable number of uprights may be used, three being shown, which are connected by a lazy tong guard 9, the parallel members 10, 11 of which are pivoted as at 12, 13 and 14 respectively. The end uprights 7 are provided with upper and lower hinges 15, 16 to which the end members 17, 18 of the guard are connected. I preferably provide the central upright 7 with upper and lower double hinges 19, 20 whereby part of the guard 9 may be swung at right angles to the running board, as shown in Fig. 4. An apertured plate 21 on said running board receives the threaded end of the central upright when it is desired to retain luggage within a limited space as is obvious.

At one end of the running board 3 I provide a pair of parallel, slidable hinges 22 secured to the rear by lugs or hooks 23 and bolts 24 and at the front of said board by additional lugs or hooks 25, the said hinges supporting at their rear 25$^a$ a longitudinal rod 22$^a$ which carries a hinged housing 26$^a$ described and claimed in my copending application, Serial No. 366,598 filed March 17, 1920.

Figure 2:
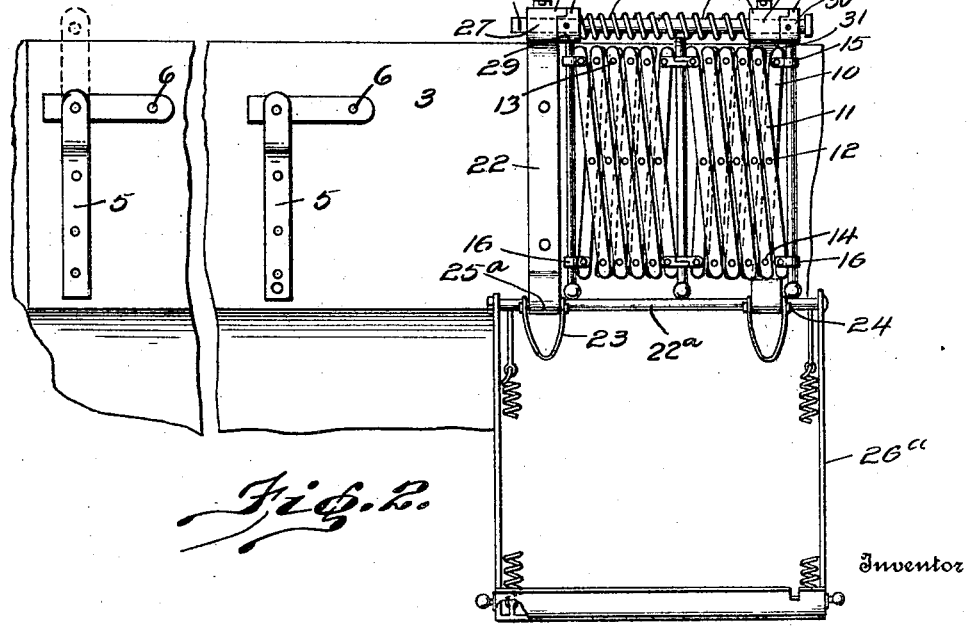
Fig. 2 is a bottom view showing the carrier in its collapsed or knock down condition.

A pivot rod 26 extends through bearings 27 in the front portion of said hinges 22 and is provided with a spring 28 connected at one end to an inner collar 29 and the opposite end abuts one of the hinges 22 as shown in Figs. 2 and 4.

A second collar 30 on the outer end of said pivot rod is also provided to rotate therewith, said collars having threaded apertures 30$^a$ to receive the ends of the uprights 7. Each of the hinges 22 are provided with a latching boss 31 for engagement with a latching lug 32 on the collars 29, 30. The pivot rod is retained at one end by the cotter pin 33 and has a small knob at its opposite end whereby the collars may be withdrawn from engagement with the latching bosses and the rod rotated so that the uprights and the guard may be dropped below the running board as pointed out in my copending application above referred to.

It will be seen that the hinges supporting the housing and guard may be moved to any part of the running board or removed therefrom as it is devoid of any permanent attaching means, which would tend to mar the appearance of the said board. In operation, assuming the guard is to be closed and concealed from view, the end and central uprights 7 are removed from the brackets 5 and the guard 9 is folded. The pivot rod 26 and the collars thereon are shifted longitudinally against the resistance of the spring, disengaging the latching bosses so that the lugs on the collars may ride over the latter and the pivot rod rotated. The vertical supports and guard carried by the pivot rod may then be dropped and swung below the running board and within the housing.

While I have shown and described but one of the various embodiments of my invention, it is readily apparent that modifications and changes therein may be resorted to and I do not therefore desire to be limited or restricted to the exact details of construction shown except as may be covered by the subject matter being claimed.

Having shown and described my invention, what I claim as new and desire to secure by Letters Patent of the U. S. is:—

1. A luggage carrier of the class described, comprising a pair of hinges secured to the under side of the running board of an automobile, and having front and rear bearings, a pivot rod rotatably supported in the front bearings, a guard having supports fixed to and rotatable with said rod, means for longitudinally moving said rod, latching means on said rod and hinges to lock the guard when moved to vertical position with respect to the running board, means for positioning the guard beneath the said board, and a housing for concealing said guard.

2. A luggage carrier of the class described, comprising a pair of slidably mounted hinges secured to the under side of the running board of an automobile, and having front and rear bearings, a pivot rod supported in the front bearings, collars mounted to rotate with said pivot rods, a lazy tong guard carried by said rod and collars, means for locking said collars to said hinges to retain the guard in a vertical position with respect to the running board, a spring carried by said pivot rod, means to shift the rod against the resistance of said spring to unlock the collars from said hinges whereby the pivot rod may be rotated and the guard dropped to a position below the running board, and a housing for concealing said guard in its inoperative position.

3. In a collapsible luggage carrier of the class described, a pair of parallel slidable hinges secured to the under side of the running board of an automobile, front and rear bearings in said hinges, a pivot rod in the front bearings, collars mounted on and rotatable with said rod, removable supports and a guard connected thereto carried by said collars, a latching boss on the front portion of said hinges and lugs on the collars for locking engagement with the boss to prevent rotation of the supports and guard when in a vertical position with respect to the running board, means for unlatching the hinges and collars whereby the guard may be swung beneath and concealed below the running board, and a housing concealing the said guard.

4. In a collapsible luggage carrier having a side guard adapted for mounting upon the running board of an automobile described, a plurality of vertical uprights threaded at their lower ends, a lazy tong guard connected to said uprights, one portion of said guard swingably at right angles with respect to the running board, means for retaining said uprights in a vertical position, parallel hinges secured to and below the running board, a pivot rod carried by said hinges, collars secured to and rotatable with said rod, latching bosses on the front portion of said hinges and lugs on said collars for locking the same to said bosses, an end upright supported by one of said collars, and a housing at the opposite end of said hinges to protect said hinges when the guard is in its elongated or set up position.

In testimony whereof, I affix my signature hereto.

JOHN M. LOVELESS.